(12) United States Patent
Li et al.

(10) Patent No.: US 8,977,256 B2
(45) Date of Patent: Mar. 10, 2015

(54) APPARATUS AND METHOD FOR SUBSCRIBING TO INTERNATIONAL ROAMING PLAN FOR COMMUNICATION DEVICE

(71) Applicants: Cheng-Zhi Li, Guangdong (CN); Jun-Wei Zhang, Guangdong (CN); Jun Zhang, Guangdong (CN)

(72) Inventors: Cheng-Zhi Li, Guangdong (CN); Jun-Wei Zhang, Guangdong (CN); Jun Zhang, Guangdong (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/662,674

(22) Filed: Oct. 29, 2012

(65) Prior Publication Data

US 2013/0260748 A1 Oct. 3, 2013

(30) Foreign Application Priority Data

Apr. 3, 2012 (CN) .......................... 2012 1 0095707

(51) Int. Cl.
*H04W 4/00* (2009.01)
*H04M 3/42* (2006.01)
*H04W 24/00* (2009.01)

(52) U.S. Cl.
USPC ..................... 455/432.1; 455/417; 455/456.4; 455/456.6

(58) Field of Classification Search
CPC ......... H04W 8/06; H04W 8/12; H04W 92/02; H04W 8/26; H04W 8/10; H04W 8/18; H04W 40/02; H04W 4/06; H04W 60/005; H04W 60/06; H04W 64/00; H04W 72/005; H04W 76/021; H04W 8/02; G01S 19/06
USPC ...................................................... 455/432.1
See application file for complete search history.

(56) References Cited

U.S. PATENT DOCUMENTS

| 6,292,666 | B1 * | 9/2001 | Siddiqui et al. | 455/456.4 |
| 2009/0011758 | A1 * | 1/2009 | Aoki et al. | 455/432.1 |
| 2009/0181651 | A1 * | 7/2009 | Klassen | 455/414.1 |
| 2009/0186633 | A1 * | 7/2009 | Yonker et al. | 455/456.6 |
| 2010/0291924 | A1 * | 11/2010 | Antrim et al. | 455/433 |
| 2011/0130118 | A1 * | 6/2011 | Fan et al. | 455/411 |
| 2013/0165089 | A1 * | 6/2013 | Fighel | 455/417 |

FOREIGN PATENT DOCUMENTS

WO    WO-2013021230 A1 *   2/2013

* cited by examiner

*Primary Examiner* — Timothy Pham
(74) *Attorney, Agent, or Firm* — Novak Druce Connolly Bove + Quigg LLP

(57) ABSTRACT

A computerized method for subscribing an international roaming plan for a communication device, the communication device includes an electronic map. At least one border checkpoint of a predetermined country can be determined on the electronic map. A distance between a current location of the communication device and the location of the at least one border checkpoint is calculated. When the calculated distance is less than a predetermined distance and the current location of the communication device is within the home country, a user may be prompted to select whether to subscribe to an international roaming plan for a particular period of time. A preset message is sent to a predetermined service terminal provided by a telecommunication company to subscribe to the international roaming plan for the communication device when the user makes a selection to subscribe to the international roaming plan for the communication device.

9 Claims, 3 Drawing Sheets

APPARATUS AND METHOD FOR SUBSCRIBING TO INTERNATIONAL ROAMING PLAN FOR COMMUNICATION DEVICE

BACKGROUND

1. Technical Field

Embodiments of the present disclosure relate to the field of mobile communication technologies, and in particular, to an apparatus and method for subscribing to an international roaming plan for a communication device.

2. Description of Related Art

Many people like travelling internationally. When a user travels outside his/her country, his/her communication device (e.g., mobile phone) may not be able to call his home country if he/she does not subscribe to an international roaming plan. This may be inconvenient. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one".

Figure 1:
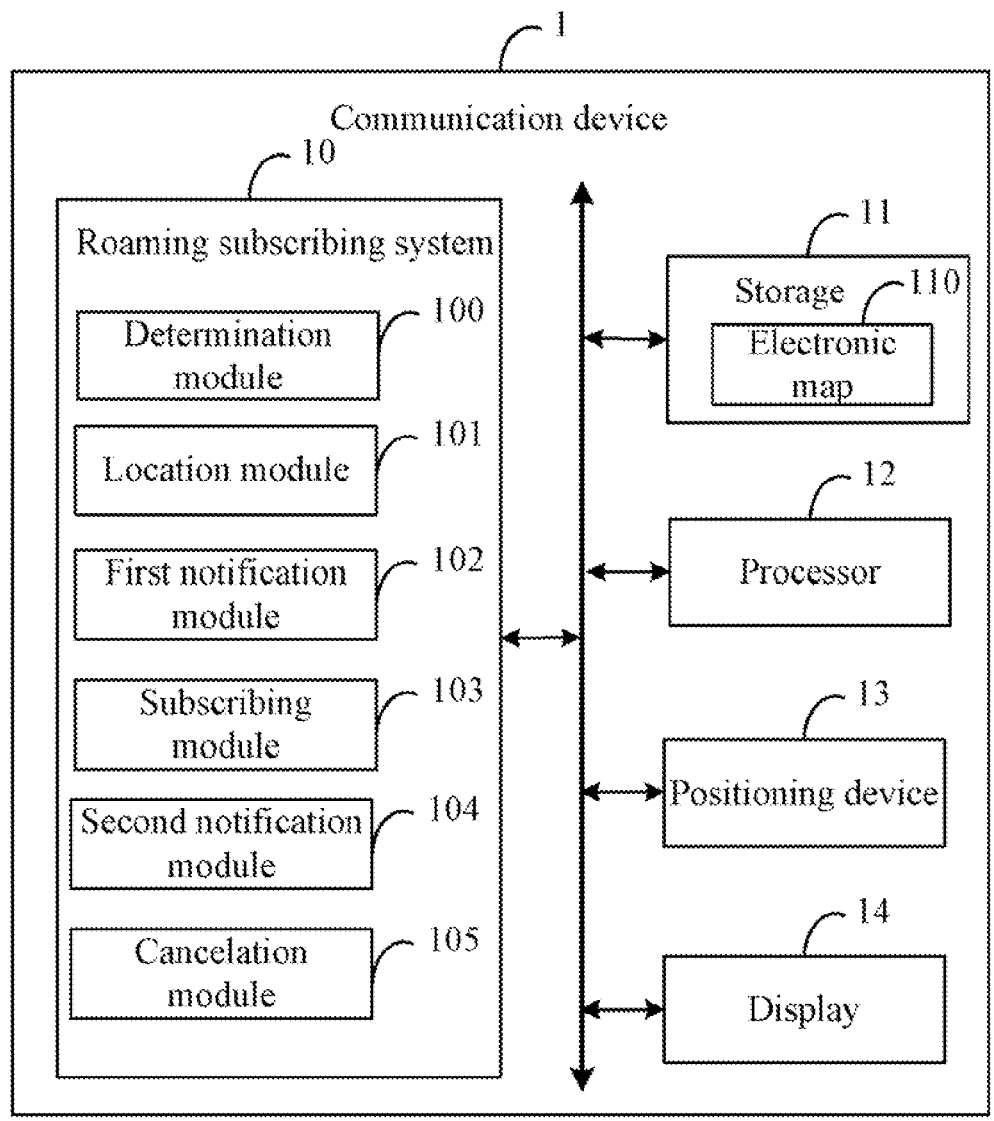
FIG. 1 is a schematic block diagram illustrating one embodiment of a communication device with international roaming capabilities on an "as needed" basis.

FIG. 1 is a schematic block diagram illustrating one embodiment of a communication device 1. The communication device 1 includes a roaming subscribing system 10, a storage 11, a processor 12, a positioning device 13, and a display 14. In the embodiment, an electronic map 110 is stored in the storage 11. The communication device 1 may be, for example, a mobile phone, a personal digital assistant, or other mobile communication device. FIG. 1 shows one example of the communication device 1, and the communication device 1 can include more or fewer components than those shown in the embodiment, or have a different configuration of the components.

The roaming subscribing system 10 may include a plurality of programs in the form of one or more computerized instructions executed by the processor 12 to perform operations of the communication device 1. In the embodiment, the roaming subscribing system 10 includes a determination module 100, a location module 101, a first notification module 102, a subscribing module 103, a second notification module 104, and a cancellation module 105. In general, the word "module", as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage devices. Some non-limiting examples of non-transitory computer-readable medium include CDs, DVDs, BLU-RAY, flash memory, and hard disk drives.

The determination module 100 determines a location of at least one border checkpoint of a predetermined country (e.g., China) on the electronic map 110. In one embodiment, the border checkpoint may be a Customs House, or a border building inside the predetermined country. The predetermined country may be a country of a user of the communication device 1, such as China.

The location module 101 obtains a current location of the communication device 1 using the positioning device 13, and calculates a distance between the current location and the location of the at least one border checkpoint. In the embodiment, the location module 101 obtains geographical coordinates including a longitude and latitude of the current location of the communication device 1 and a longitude and latitude of the at least one border checkpoint. Then, the location module 101 calculates the distance between the current location and the location of the at least one border checkpoint according to the obtained geographical coordinates. The positioning device 13 may be a global positioning system (GPS) receiver of the communication device 1.

Figure 3:
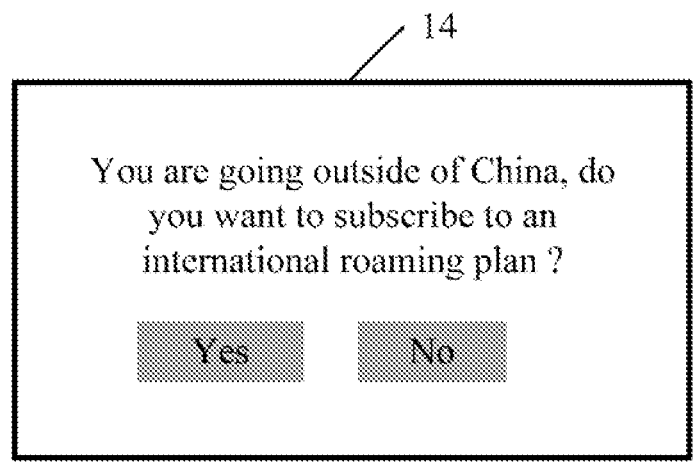
FIG. 3 is a schematic diagram of an example of notifying a user through a dialog box of the communication device of FIG. 1.

The first notification module 102 determines whether the distance between the current location and the location of the at least one border checkpoint is less than a predetermined distance (e.g., 100 meters or 20 meters) and whether the current location of the communication device 1 is inside the predetermined country. When the distance between the current location and the location of the at least one border checkpoint is less than the predetermined distance and the current location of the communication device 1 is inside the predetermined country, the first notification module 102 notifies a user to select whether to subscribe to an international roaming plan for the communication device 1. In one embodiment, as shown in FIG. 3, the first notification module 102 may notify the user by displaying a dialog box including options on the display 14. The user may select one of the options to subscribe to the international roaming plan for the communication device 1. Further, the first notification module 102 may trigger the communication device 1 to vibrate and/or to give audible warnings to the user that the dialog box is being displayed.

Additionally, the first notification module 102 may determine a foreign region outside of the predetermined country which the user is likely to enter according to the at least one border checkpoint, and display information as to the determined foreign region on the display 14. For example, if the at least one border checkpoint near the current location of the communication device 1 is a Customs House between China and Hong Kong, the first notification module 102 may display a text message of "You may be entering Hong Kong district" on the display 14.

The subscribing module 103 sends a first preset message to a predetermined service terminal (e.g., a communication server having a particular identification number such as 10086) provided by a telecommunication company to allow a user to subscribe to an international roaming plan for the communication device 1, if the user makes a selection to subscribe to the international roaming plan for the communication device 1. The service terminal is provided by the telecommunication company, such as china mobile communication company to provide communication services for the communication device 1. In one example, the first preset message may be a text message including the string of "JHGJMYFW".

The second notification module 104 determines whether the distance between the current location and the location of the at least one border checkpoint is less than the predetermined distance and the current location of the communication device 1 is in fact located in the determined foreign region at regular intervals (e.g., every two or three hours) after the international roaming plan has been subscribed to for a predetermined period of time (e.g., 12 hours). When the distance between the current location and the location of the at least one border checkpoint is less than the predetermined distance and the current location of the communication device 1 is still within the determined foreign region, the second notification module 104 prompts the user to select whether to cancel the international roaming plan which has previously been subscribed to. If the user makes a selection to cancel the international roaming plan, the cancellation module 105 sends a second preset message to the predetermined service terminal to cancel the international roaming plan presently being used by the communication device 1, so that expense may be saved.

Figure 2:
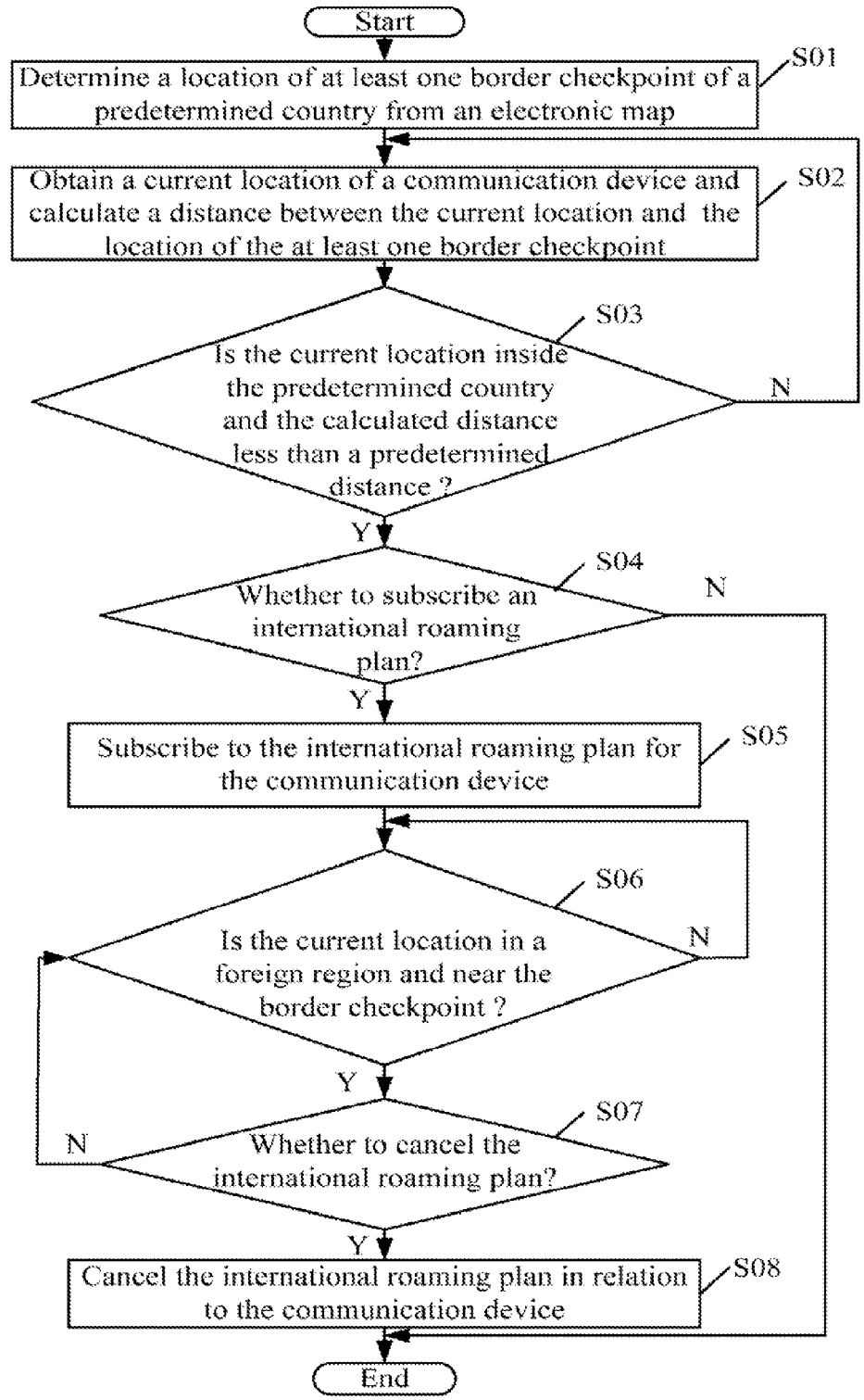
FIG. 2 is a flowchart of one embodiment of a method for subscribing to an international roaming plan for the communication device of FIG. 1.

FIG. 2 shows a flowchart of one embodiment of a method for subscribing to an international roaming plan by the communication device 1 of FIG. 1. Depending on the embodiment, additional steps may be added, others removed, and the ordering of the steps may be changed.

In step S01, the determination module 100 determines a location of at least one border checkpoint of a predetermined country (e.g., China) on the electronic map 110.

In step S02, the location module 101 obtains a current location of the communication device 1 using the positioning device 13, and calculates a distance between the current location and the location of the at least one border checkpoint.

In step S03, the first notification module 102 determines whether the calculated distance is less than a predetermined distance and whether the current location of the communication device 1 is inside the predetermined country. If the calculated distance is less than the predetermined distance and the current location of the communication device 1 is inside the predetermined country, step S04 is implemented. Otherwise, the procedure goes back to step S02.

In step S04, the first notification module 102 displays notification to notify a user to select whether to subscribe to an international roaming plan for the communication device 1.

In step S05, when the user subscribes to the international roaming plan, the subscribing module 103 sends a first preset message to a predetermined service terminal provided by a telecommunication company to subscribed to the international roaming plan for the benefit of the communication device 1.

After the international roaming plan has been subscribed to for a predetermined period of time (e.g., 12 hours), the procedure goes to step S06. In step S06, the second notification module 104 determines whether the current location of the communication device 1 is located in a foreign region outside the predetermined country and near the at least one border checkpoint, at regular intervals (e.g., every two or three hours). For example, if the distance between the current location of the communication device 1 and the location of the at least one border checkpoint is less than the predetermined distance, the communication device 1 is determined to be near the at least one border checkpoint.

When the current location of the communication device 1 is located in a foreign region outside the predetermined country and near the at least one border checkpoint, the procedure goes to step S07. In step S07, the second notification module 104 notifies the user whether to cancel the subscribed international roaming plan.

If the user selects to cancel the international roaming plan to which he has previously subscribed, the procedure goes to step S08. In step S08, the cancellation module 105 sends a second preset message to the predetermined service terminal to cancel the subscribed international roaming plan in relation to the communication device 1. If the user does not cancel the international roaming plan, the procedure goes back to step S06.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized method for subscribing to an international roaming plan for a communication device, the communication device comprising a positioning device and an electronic map, the method comprising:

determining a location of at least one border checkpoint of a predetermined country on the electronic map;

obtaining a current location of the communication device using the positioning device;

calculating a distance between the current location and the location of the at least one border checkpoint;

determining whether the calculated distance is less than a predetermined distance and whether the current location of the communication device is inside the predetermined country;

notifying a user to select whether to subscribe to an international roaming plan for the communication device when the calculated distance is less than the predetermined distance and the current location of the communication device is inside the predetermined country;

sending a first preset message to a predetermined service terminal provided by a telecommunication company to subscribe to the international roaming plan for the communication device, when the user makes a selection to subscribe to the international roaming plan for the communication device;

determining whether the current location of the communication device is located outside the predetermined country and whether the distance between the current location and the location of the at least one border checkpoint is less than the predetermined distance at regular intervals after the international roaming plan has been subscribed to for a predetermined period of time;

prompting the user to select whether to cancel the international roaming plan which has previously been subscribed to, when the current location of the communication device is located outside the predetermined country and the distance between the current location of the communication device and the location of the at least one border checkpoint is less than the predetermined distance; and sending a second preset message to the predetermined service terminal to cancel the international roaming plan in relation to the communication device, when the user makes a selection to cancel the international roaming plan.

2. The method according to claim 1, wherein the notifying step comprises:

displaying a dialog box including options on a display of the communication device, and triggering the communication device to vibrate and/or to give audible warnings to the user that the dialog box is being displayed.

3. The method according to claim 2, wherein the notifying step comprises:
   determining a foreign region outside of the predetermined country which the user is likely to enter according to the at least one border checkpoint, and displaying information as to the determined foreign region on the display.

4. The method according to claim 1, wherein the obtaining step comprises:
   obtaining geographical coordinates including a longitude and latitude of the current location of the communication device and a longitude and latitude of the at least one border checkpoint.

5. The method according to claim 4, wherein the calculating step comprises:
   calculating the distance between the current location and the location of the at least one border checkpoint according to the obtained geographical coordinates of the current location of the communication device and the at least one border checkpoint.

6. A communication device, comprising:
   a display;
   a positioning device;
   a storage storing an electronic map;
   a processor; and
   one or more programs stored in the storage and executed by the processor, the one or more programs comprising:
   a determination module that determines at least one border checkpoint of a predetermined country on the electronic map;
   a location module that obtains a current location of the communication device using the positioning device, and calculates a distance between the current location and the location of at least one border checkpoint;
   a first notification module that determines whether the calculated distance is less than a predetermined distance and whether the current location of the communication device is inside the predetermined country, and notifies a user to select whether to subscribe to an international roaming plan for the communication device when the calculated distance is less than the predetermined distance and the current location of the communication device is inside the predetermined country;
   a subscribing module that sends a first preset message to a predetermined service terminal provided by a telecommunication company to subscribe to the international roaming plan for the communication device, when the user makes a selection to subscribe to the international roaming plan for the communication device;
   a second notification module that determines whether the current location of the communication device is located outside the predetermined country and whether the distance between the current location and the location of the at least one border checkpoint is less than the predetermined distance at regular intervals when the international roaming plan has been subscribed to for a predetermined period of time, and prompts the user to select whether to cancel the international roaming plan which is being subscribed to when the current location of the communication device is located outside the predetermined country and the distance between the current location of the communication device and the location of the at least one border checkpoint is less than the predetermined distance; and
   a cancellation module that sends a second preset message to the predetermined service terminal to cancel the international roaming plan in relation to the communication device, when the user makes a selection to cancel the international roaming plan.

7. The communication device according to claim 6, wherein the first notification module further displays a dialog box including options on the display of the communication device, and triggers the communication device to vibrate and/or to give audible warnings to the user that the dialog box is being displayed.

8. The communication device according to claim 7, wherein the first notification module further determines a foreign region outside of the predetermined country which the user is likely to enter according to the at least one border checkpoint, and displays information as to the determined foreign region on the display.

9. The communication device according to claim 6, wherein the location module further obtains geographical coordinates including a longitude and latitude of the current location of the communication device and the at least one border checkpoint, and calculates the distance between the current location and the location of the at least one border checkpoint according to the obtained geographical coordinates of the current location of the communication device and the at least one border checkpoint.

* * * * *